Dec. 8, 1942.   C. J. WERNER ET AL   2,304,617
ELECTRIC MOTOR CONTROL
Filed May 21, 1940

INVENTORS
CALVIN J. WERNER AND
IRVING M. LEVY
BY
Spencer, Hardman and Felu
ATTORNEYS Patented Dec. 8, 1942

2,304,617

UNITED STATES PATENT OFFICE 2,304,617

ELECTRIC MOTOR CONTROL

Calvin J. Werner and Irving M. Levy, Dayton, Ohio, assignors to General Motors Corporation, Detroit, Mich., a corporation of Delaware Application May 21, 1940, Serial No. 336,433

4 Claims. (Cl. 172—279)

This invention relates to a system of control for an electric motor.

It is among the objects of the present invention to control the operation of an electric motor by and in accordance with variations in current conditions in an electric translating device with which said motor is associated.

For purposes of illustration, the electric translating device may be an electric motor adapted to drive refrigerating apparatus and in such an installation the controlled motor would be used to operate a fan for cooling certain parts of the apparatus. Refrigerating apparatus at times provides heavy loads which necessitate the use of a driving motor of comparatively greater horsepower rating than the power rating of the controlled motor which operates the fan at comparatively lesser load requirements. Therefore in an installation of this kind the main driving motor has a power rating considerably greater than the fan motor. Usually both motors are separably connected across the power line and therefore operate independently of each other. If so connected, the fan motor will operate only at maximum speed which will prove very uneconomical as far as current consumption is concerned inasmuch as the refrigerating apparatus cooled by the fan motor, will at times require considerably less cooling air than is delivered by the fan running at maximum speed.

The present invention therefore provides for the operation of the fan motor at speeds varying in accordance with the requirements of the refrigerating apparatus and inasmuch as the driving motor operates in accordance with such requirements the fan motor of the present invention is directly, electrically connected to the said driving motor and is controlled thereby so as to operate in accordance with current conditions in said driving motor. To effect such control of the fan motor by the main driving motor, the field winding of said fan motor, preferably of the single phase, shaded pole type, is permanently connected in series with a running winding of the main driving motor of the alternating current type. During starting, a comparatively heavy surge of current traverses the main driving motor which heavy current, when flowing through a winding of the fan motor, will facilitate its starting and quickly reach proper operating speed. Under light load requirements the main motor will draw a minimum current flow, which minimum flow through the fan motor will cause it to operate at a low speed. On the other hand, when the main motor is operating under a heavy load, at which time parts of the refrigerating apparatus heat up and require increased cooling air, said main motor will have a heavier current flow therethrough and consequently also the fan motor, said heavier flow of current through the winding of the fan motor resulting in its faster operation and a greater air delivery. Thus the present invention utilizes an already existing part of the refrigerating system as a control device for regulating the operation of the fan motor.

It is obvious that there may be variations in the relative sizes of the two motors. However, the present invention contemplates that the relationship between the motors be such that the larger motor controls the speed of the smaller motor without having the smaller motor affect the operation of the larger motor to any appreciable or practical extent.

Further objects and advantages of the present invention will be apparent from the following description, reference being had to the accompanying drawing, wherein a preferred embodiment of the invention is clearly shown.

Figure 3:
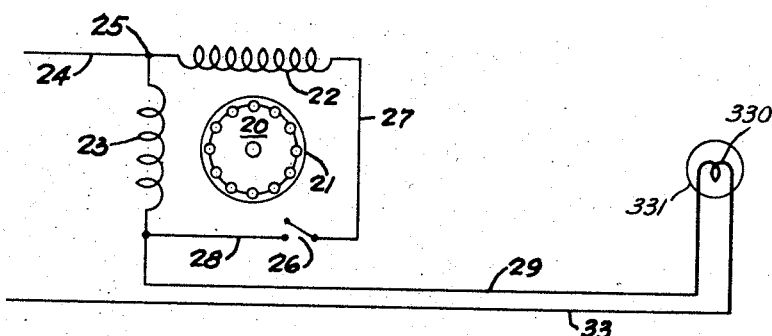

Fig. 3 diagrammatically shows a split-phase or shaded pole fan motor having its one field winding connected in series with the line circuit of the main motor.

Figure 4:
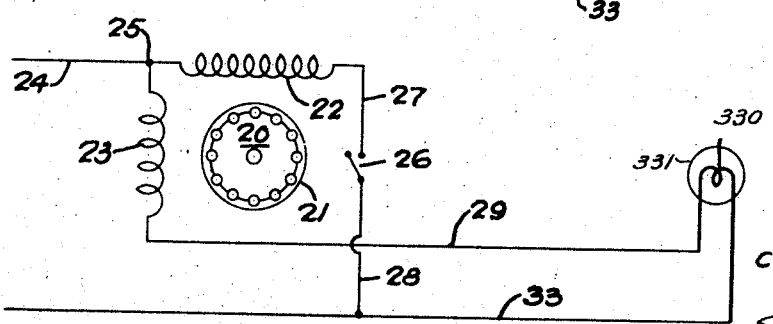

Fig. 4 differs from Fig. 3 in that the phase winding of the main motor is connected across the power line instead of in parallel with the running winding as shown in Fig. 3.

Figure 1:
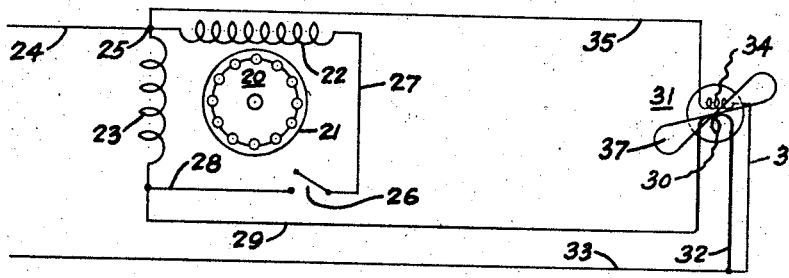
Fig. 1 is a diagrammatic view showing an A. C. motor provided with shunt and series windings, the former being connected across the power line, the latter in series with the line circuit of the main driving motor.

Referring to the drawing and particularly Fig. 1, the split-phase A. C. electric motor designated as a whole by the numeral 20 has a rotor 21. This is the main motor and when used in refrigeration systems drives the compressor unit. The numeral 22 designates the phase or starting winding of the motor 20, and 23 designates the main or running winding. An end of each winding 22 and 23 is connected to one side 24 of the power line as at 25. The other end of the phase of starting winding 22 is connected to the switch or relay 26 through wire 27. This switch or relay may be any suitable automatic type capable of breaking its circuit when the motor 20 has attained a proper running speed. The other end of the main or running winding 23 is connected to the switch 26 through wire 28. A wire 29 leads from the wire 28 to the one end of the series winding 30 of the shading coil fan motor 31, the other end of said series winding 30 being connected through wire 32 with the other side 33 of the power line. A shunt field winding 34 of the fan motor 31 has one end connected to the side 24 of the power line as at 25 through wire 35, while the opposite end of said winding 34 is connected through wire 36 to the other side 33 of the power line. This fan motor 31 is used to drive fan blades indicated by the numeral 37 to cool the condenser unit when this invention is used in a refrigeration system.

Figure 2:
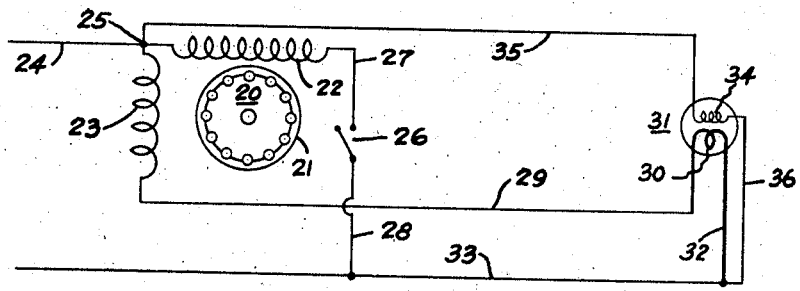
Fig. 2 is a view similar to Fig. 1, however here the series winding of one motor is connected in series with the running winding of the other motor and its excitation is obtained from the main winding current of the second motor instead of line current in Fig. 1.

The description of Fig. 1 may be used for the device disclosed in Fig. 2, with the exception, however, where in Fig. 1, the one side of switch 26 is described as being connected to the one end of running winding 23 through the wire 28, in Fig. 2, the switch 26 is connected directly with the side 33 of the power line by wire 28 and wire 29 in this case directly connects the running winding 23 of motor 20 with the series field winding 30 of the fan motor 31.

In the device shown in Fig. 1, switch 26 is normally closed. When the power line circuit is completed to the motor 20 by the closing of any suitable starting switch (not shown) in the circuit, current will flow through both the phase and running windings 22 and 23 respectively, of motor 20. The line current flowing through the motor 20 will also flow through the series winding 30 of the shading coil fan motor 31. In starting, motor 20 will draw a comparatively heavy current from the line, said current flow dropping off considerably, however, after the motor has started and has attained its proper running speed. Naturally, the series winding 30 of the fan motor 31 will consequently have a comparatively heavy flow of current therethrough during the starting cycle and thus this increased magnetic flux will facilitate starting of the fan motor. The drop in current flow when the motor 21 is running properly will result in a drop of current flow through the series winding of the fan motor, thus during its normal running cycle the watt input may be maintained at a minimum without sacrificing proper operation for efficient cooling. Any increase in load upon the compressor motor 20 will cause an increase in current flow therethrough which also results in an increase of current flow through the series winding 30 of the fan motor 31, thereby increasing its magnetic flux which will result in a slight increase in motor speed and consequent increase in air delivery by the fan 37 of said motor. The compound type of fan motor shown in Figs. 1 and 2 may be of any suitable ratio, that is, the relative strength of the series and shunt field windings 30 and 34 respectively may be varied to meet any desired degree of compounding.

The fan motor 31 of Fig. 2 is identical with that shown in Fig. 1. The main motor 20, however, differs in that the phase winding 22 of the Fig. 2 motor is connected directly across the power line 24—33 with the switch 26 in series with the winding 22. The series winding 30 of the fan motor is connected in series with the main or running winding 23 of the motor 20 in the Fig. 2. Thus the same current flowing through the running winding 23 of motor 20 will also flow through winding 30 of the fan motor 31, said winding 30 not being affected by the phase winding 22 of motor 20 in this instance as in the case of Fig. 1 where the phase winding 22 of motor 20 is also in series with fan motor winding 30 inasmuch as phase winding 22 is connected in parallel with the running winding 23 of the motor 20. The effect of the winding 23 of the motor 20 upon the fan motor 30 in the device of Fig. 2 is different than the effect of both windings 22 and 23 of motor 20 in Fig. 1, especially during the starting cycle of the devices.

In Figs. 3 and 4 the fan motor 331 is provided with only a series winding 330. Fig. 3 illustrates a device in which the split phase motor 20 is similar to Fig. 1, however, the shunt winding 34 of the fan motor 31 and its connecting wires 35 and 36 of Fig. 1 have been eliminated. The device of Fig. 4 is like that of Fig. 3, with the exception, however, that the split phase motor has connections similar to Fig. 2, whereas in Fig. 3 the split phase motor 20 has connections similar to Fig. 1.

Where substantial increases in air delivery by the fan motor are required at increased load of the main motor 20, devices as shown in Figs. 3 and 4 are preferable. In the straight series type of fan motor, as shown in Figs. 3 and 4, good starting characteristics are still obtained as well as reduced running speed of the fan motor when the main motor 20 is operating under light loads and a reduced air delivery is desired. Under these conditions a low watt input to the fan motor and quieter operation thereof results. However, as the load upon the main motor 20 is increased, it will require and draw an increased current flow, thereby increasing the speed of fan motor and its air delivery. This automatic increase in air delivery at increasing loads is a very desirable advantage, for, as the load on the main motor 20 is decreased, watt input into the fan motor 331 and its consequent air delivery is also decreased, while on the other hand, if the main motor 20 is subjected to increased loads, watt input into the fan motor with its straight series winding 330 is likewise increased, resulting in a higher operating speed and greater air delivery.

The fan motor shown in the various figures are illustrated as operating with single phase motors, however, it is understood that the same type fan motor may be used in conjunction with polyphase motors, the compound or series type fan motor operating off of one phase of the polyphase motor.

While the embodiment of the present invention as herein disclosed constitutes a preferred form, it is to be understood that other forms might be adopted, all coming within the scope of the claims which follow.

What is claimed is as follows:

1. In combination with a split phase type A. C. motor having main and phase windings and means for rendering the phase winding ineffective when the motor has attained proper running speed; of a second motor having shunt and series windings, the series winding being permanently connected in series with the main winding of the first mentioned motor.

2. In combination with a split phase electric motor having starting and running windings adapted to be connected to a power line; of a second motor having a shunt winding connected across the power line and a series winding permanently connected in series with the running winding of the first mentioned motor.

3. In combination with an electric motor having a rotor, a main or running winding, a phase or starting winding connected in parallel with said running winding; a switch in series with said starting winding and adapted to render said starting winding ineffective when the motor has attained a proper operating speed; of a second motor provided with a series winding constantly connected in series with the running winding of the first mentioned motor, said second motor having also a shunt winding connected in parallel with the running winding and the said series winding.

4. In combination with an electric motor provided with terminals adapted to be connected to a power line, said motor having a rotor, a running winding, one end of which is connected to a motor terminal, a starting winding connected across the motor terminals, a switch in series with the starting winding normally rendering said winding effective, but adapted to render it ineffective when the motor has attained a proper operating speed; of a motor having a series winding, one end of which is permanently connected with the other end of said running winding, the other end of said series winding being connected to the other motor terminal, and a shunt winding connected in parallel with said running and series winding.

CALVIN J. WERNER.
IRVING M. LEVY.